(12) United States Patent
Fossett et al.

(10) Patent No.: US 12,188,190 B2
(45) Date of Patent: Jan. 7, 2025

(54) SPREADER WITH SHAFTLESS AUGER

(71) Applicant: Douglas Dynamics, L.L.C., Milwaukee, WI (US)

(72) Inventors: Ryan Fossett, Hazel Park, MI (US); Christopher Aaron Horn, Menomonee Falls, WI (US); Gregory B. Neilson, Troy, MI (US); Paul Yagiela, Rochester Hills, MI (US)

(73) Assignee: Douglas Dynamics, L.L.C., Milwaukee, WI (US)

( * ) Notice: Subject to any disclaimer, the term of this patent is extended or adjusted under 35 U.S.C. 154(b) by 0 days.

(21) Appl. No.: 18/301,284

(22) Filed: Apr. 17, 2023

(65) Prior Publication Data
US 2023/0250601 A1  Aug. 10, 2023

Related U.S. Application Data

(62) Division of application No. 16/277,647, filed on Feb. 15, 2019, now Pat. No. 11,680,379.

(51) Int. Cl.
*E01H 10/00* (2006.01)
*B65G 33/32* (2006.01)
*B65G 33/24* (2006.01)

(52) U.S. Cl.
CPC ........... *E01H 10/007* (2013.01); *B65G 33/32* (2013.01); *B65G 33/24* (2013.01)

(58) Field of Classification Search
CPC ... E01H 10/007; A01C 15/18; E01C 19/2045; E01C 2019/207–209; B65G 33/00
See application file for complete search history.

(56) References Cited

U.S. PATENT DOCUMENTS

| | | |
|---|---|---|
| 85,782 A | 1/1869 | Bartlett |
| 3,033,163 A | 5/1962 | Hostetler et al. |

(Continued)

FOREIGN PATENT DOCUMENTS

| | | |
|---|---|---|
| CN | 201416169 Y | 3/2010 |
| CN | 101837896 A | 9/2010 |

(Continued)

OTHER PUBLICATIONS

BOSS Products, a division of The TORO Company; BOSS Snowplow / UTV V-Box Spreaders Product Webpage, https://www.bossplow/en/products/ice-control-equipment/utv-hopper-spreader, Nov. 6, 2018.

(Continued)

*Primary Examiner* — Tuongminh N Pham
(74) *Attorney, Agent, or Firm* — Wood Herron & Evans LLP

(57) ABSTRACT

A spreader comprises a hopper for containing sand, salt or other granular material to be spread upon snow or ice on paved surfaces, the hopper being adapted to be installed in or on a bed of a truck, the hopper having a trough, a shaftless auger positioned in the trough, an auger motor for driving the auger, a spinner positioned at one end of the auger for slinging the granular material upon the snow or ice, a spinner motor for driving the spinner, and at least one keeper supported by the trough and extending over the auger for retaining the auger in place during operation and thereby reducing flexure of the auger and resulting loss of efficiency of material transport by the auger during operation of the spreader.

10 Claims, 11 Drawing Sheets

(56) References Cited

U.S. PATENT DOCUMENTS

| | | |
|---|---|---|
| 3,170,566 A | 2/1965 | Zimmermann |
| 3,543,948 A | 12/1970 | Tatum |
| 4,003,339 A | 1/1977 | Hostetler |
| 4,779,528 A | 10/1988 | Bruke |
| 4,850,515 A | 7/1989 | Cleland |
| 4,922,768 A | 5/1990 | Bruke |
| 5,000,307 A | 3/1991 | Bruke |
| 5,092,453 A | 3/1992 | Bruke |
| 5,337,658 A | 8/1994 | Bruke |
| 5,562,029 A | 10/1996 | Bruke |
| 5,868,153 A | 2/1999 | Cohen et al. |
| 5,885,008 A | 3/1999 | Ward |
| 5,906,293 A | 5/1999 | Geiser et al. |
| 6,109,478 A | 8/2000 | Blenkinsop et al. |
| 6,283,275 B1 | 9/2001 | Morris et al. |
| 6,375,386 B1 | 4/2002 | Macku et al. |
| 6,953,163 B2 | 10/2005 | Truan et al. |
| 9,014,768 B2 | 4/2015 | Nagasu et al. |
| 9,199,804 B2 | 12/2015 | Hughes |
| 9,561,909 B2 | 2/2017 | Van Der Woning |
| 2005/0000782 A1* | 1/2005 | McDaniel ............... B65G 39/02 198/842 |
| 2011/0293392 A1 | 12/2011 | Ekholm |
| 2017/0042165 A1 | 2/2017 | Shell |
| 2017/0050270 A1 | 2/2017 | Miyano et al. |
| 2018/0141758 A1 | 5/2018 | Ross |
| 2019/0168970 A1 | 6/2019 | Maeda et al. |

FOREIGN PATENT DOCUMENTS

| | | |
|---|---|---|
| CN | 201999475 U | 10/2011 |
| CN | 105836399 A | 8/2016 |
| CN | 205708543 U | 11/2016 |
| CN | 106492519 A | 3/2017 |
| EP | 0927690 B1 | 5/2003 |
| EP | 1854555 B1 | 12/2009 |
| EP | 2592024 A1 | 5/2013 |
| GB | 2281494 A | 3/1995 |
| JP | 3316733 B2 | 8/2002 |
| KR | 20050037611 A | 4/2005 |
| WO | 1999021783 A1 | 5/1999 |

OTHER PUBLICATIONS

Vulcan Industries; Model TF Shaftless Screws Conveyor Product Information Sheet; 2018.

Mecke, Bill; Shaftless Screw Conveyors: a Perfect Soluctions for Handling Bulk Solids, Apr. 12, 2012.

Orthman Manufacturing, Inc.; Shaftless Screw Conveyors Product Information Sheet, 2018.

* cited by examiner

SPREADER WITH SHAFTLESS AUGER

RELATED APPLICATIONS

This application is a divisional of U.S. patent application Ser. No. 16/277,647 filed Feb. 15, 2019, which is hereby incorporated by reference herein as if fully set forth in its entirety.

FIELD OF THE INVENTION

This invention relates generally to snow and ice control, and more particularly to improvements in spreaders for spreading sand, salt, or other granular chemicals onto snow and ice covered paved surfaces.

BACKGROUND OF THE INVENTION

Spreaders for spreading salt or other granular chemicals for melting snow and ice on paved surfaces, or for spreading abrasives such as sand for otherwise reducing the deleterious effects of snow and ice on paved surfaces, are well known. One type of spreader has a hopper for containing the material to be spread, a motorized spinner for slinging the material onto the pavement, and a motorized auger for moving the material from the hopper to the spinner. The spreader may be mounted in a bed of a truck, for example a pickup truck or other work truck. This type of spreader is commonly referred to as a truck bed hopper spreader.

The typical shafted screw conveyor or auger conveyor used in a truck bed hopper spreader has a helical screw blade, called a "flighting", affixed to a rotating shaft extending the length of the flighting. The rotating shaft may be supported in bearings at either end and driven by a motor at one of the ends. So-called shaftless augers are also known. As the name implies, the flighting is not affixed to a rotating shaft extending the length of the flighting. Rather, the flighting itself may be supported in bearings at either end and/or supported in a trough and driven by a motor at one of the ends.

Shaftless augers are especially useful in handling bulk solids that have a high moisture content. These bulk solids are typically sticky and can be difficult to convey in conventional shafted augers, as sticky bulk solids tend to adhere to the shaft where the flighting meets the shaft. For example, some spreaders incorporate a pre-wetting feature where brine and salt are mixed before being delivered by the auger to the spinner, the benefit being that the pre-wetted salt stays applied to the pavement instead of bouncing off or being blown off by traffic like dry salt, thus reducing waste. Such pre-wetted salt can adhere to the shaft where the flighting meets the shaft. Shaftless augers eliminate this problem because there is no shaft and only the flighting is used to convey the material.

Shaftless augers have been used in smaller hopper spreaders, for example hopper spreaders of the type mounted in the bed of a side-by-side four-wheel drive vehicle known as a UTV (utility vehicle or utility task vehicle). However, shaftless augers have heretofore not been successfully used in larger hopper spreaders of the type used for truck bed applications due to challenges in "scaling up the design", and specifically, due to excessive flexure of the auger under load resulting in reduced efficiency of material transport.

Accordingly, it is desirable to incorporate a shaftless auger and its appurtenant advantages into a truck bed hopper spreader.

SUMMARY OF THE INVENTION

In one aspect, a spreader comprises a hopper for containing sand, salt or other granular material to be spread upon snow or ice on paved surfaces, the hopper being adapted to be installed in or on a bed of a truck, the hopper having a trough, a shaftless auger positioned in the trough, an auger motor for driving the auger, a spinner positioned at one end of the auger for slinging the granular material upon the snow or ice, a spinner motor for driving the spinner, and at least one keeper supported by the trough and extending over the auger for retaining the auger in place during operation and thereby reducing flexure of the auger and resulting loss of efficiency of material transport by the auger during operation of the spreader.

The spreader can include a plurality of keepers spaced along a length of the auger. The keeper can be a relatively narrow and relatively thin strap, and the strap can form an angle of about 90 degrees with an edge of the flighting of the auger directly below the strip. The strap can be about two inches wide and about 0.135 inches thick, and can be fabricated of steel. The keeper can also be an inverted V-shaped structure.

The other end of the auger can have a bushing secured thereto, the bushing fabricated of a lubricious material, and the spreader can further include a bushing plate secured to the hopper, the bushing plate including a spindle that supports the bushing. The bushing can be fabricated of polymer, for example UHMW. The bushing plate can further include a shield positioned above the spindle to deflect the granular material off of the bushing. The bushing can be bolted to the other end of the auger.

The spreader can further include a replaceable wear plate secured to a surface of one side of the trough to prevent damage to the one side of the trough during operation. The wear plate can be fabricated of stainless steel and can be about 0.06 inches thick. The wear plate can be bolted to the surface of the one side of the trough.

In another aspect, a spreader comprises a hopper for containing sand, salt or other granular material to be spread upon snow or ice on paved surfaces, the hopper being adapted to be installed in or on a bed of a truck, the hopper having a trough, an auger positioned in the trough, an auger motor for driving the auger, a spinner positioned at one end of the auger for slinging the granular material upon the snow or ice, a spinner motor for driving the spinner, a bushing secured to the other end of the auger, the bushing fabricated of a lubricious material, and a bushing plate secured to the hopper, the bushing plate including a spindle that supports the bushing.

In another aspect, a spreader comprises a hopper for containing sand, salt or other granular material to be spread upon snow or ice on paved surfaces, the hopper being adapted to be installed in or on a bed of a truck, the hopper having a trough, an auger positioned in the trough, an auger motor for driving the auger, a spinner positioned at one end of the auger for slinging the granular material upon the snow or ice, a spinner motor for driving the spinner, and a replaceable wear plate secured to a surface of one side of the trough to prevent damage to the one side of the trough during operation.

In another aspect, a spreader comprises a hopper for containing sand, salt or other granular material to be spread upon snow or ice on paved surfaces, the hopper being adapted to be installed in or on a bed of a truck, the hopper having a trough, a shaftless auger positioned in the trough, an auger motor for driving the auger, a spinner positioned at one end of the auger for slinging the granular material upon the snow or ice, a spinner motor for driving the spinner, at least one keeper supported by the trough and extending over the auger for retaining the auger in place during operation and thereby reducing flexure of the auger and resulting loss of efficiency of material transport by the auger during operation of the spreader, a bushing secured to the other end of the auger, the bushing fabricated of a lubricious material, a bushing plate secured to the hopper, the bushing plate including a spindle that supports the bushing, and a replaceable wear plate secured to a surface of one side of the trough to prevent damage to said one side of said trough during operation.

The accompanying drawings, which are incorporated in and constitute a part of this specification, illustrate embodiments of the invention and, together with the summary of the invention given above, and the detailed description of the drawings given below, serve to explain the principles of the present invention.

DETAILED DESCRIPTION OF THE DRAWINGS

Figure 1:
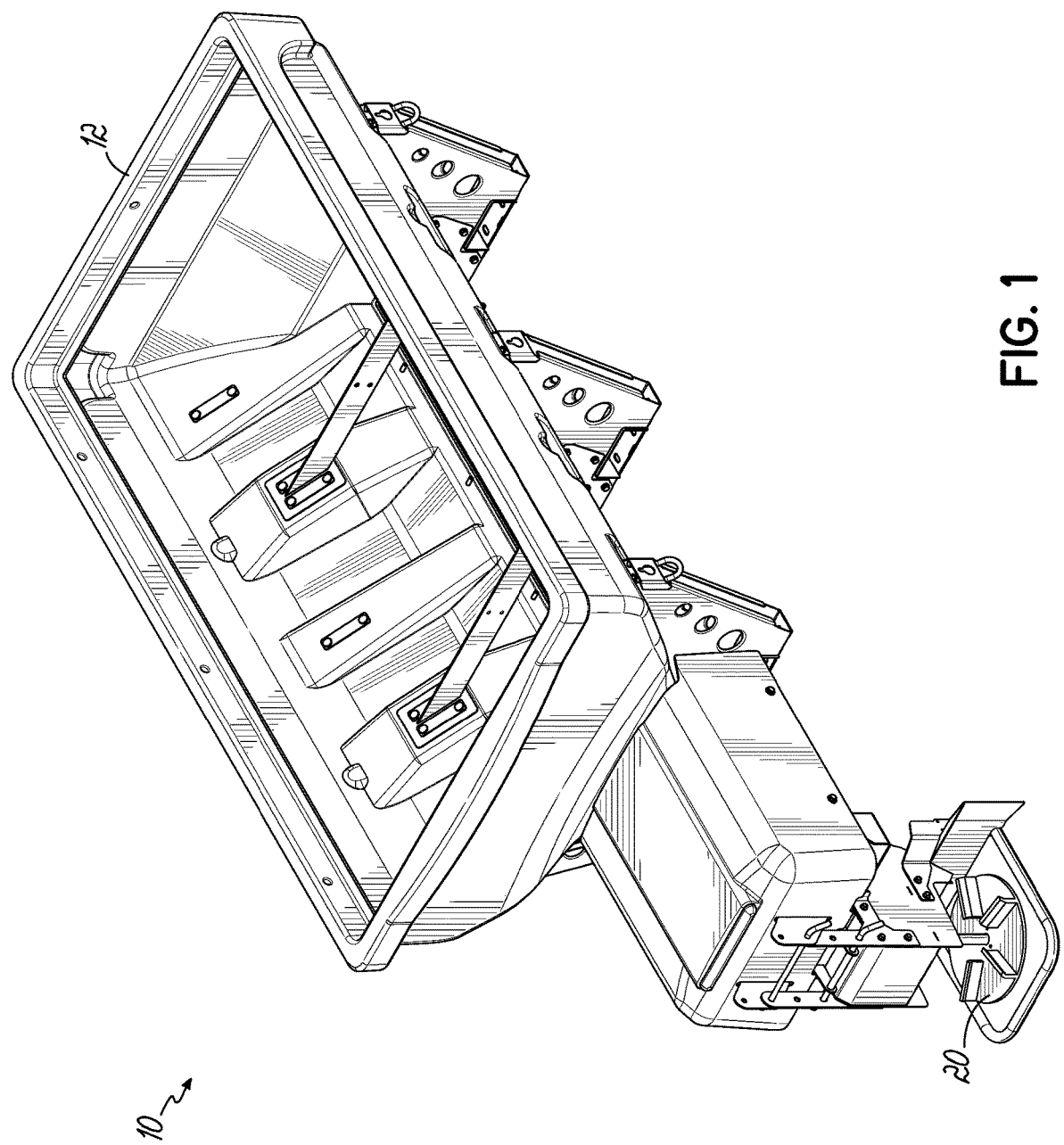
FIG. 1 is a top, rear, right side perspective view of a spreader according to the principles of the present invention.
Figure 2:
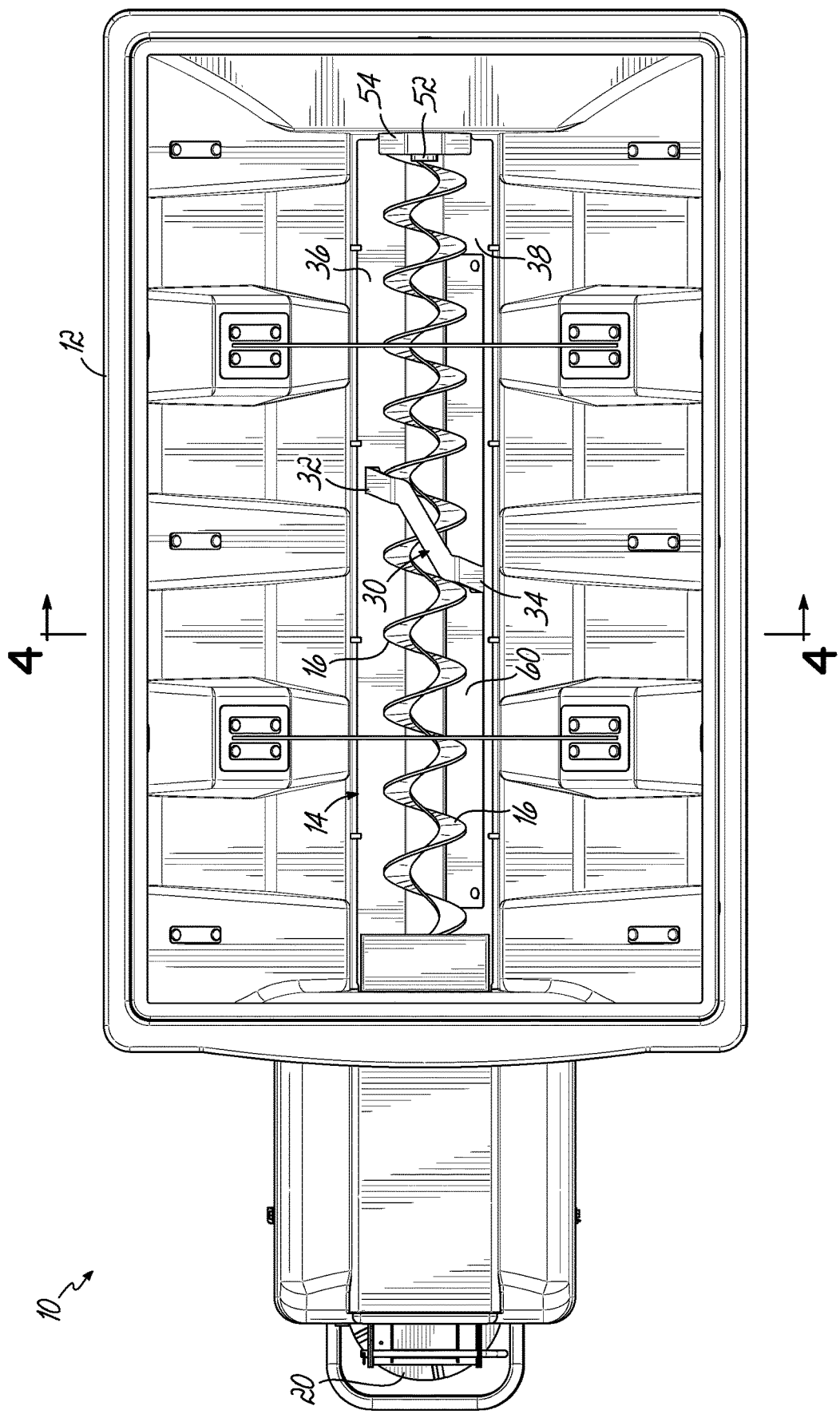
FIG. 2 is a top view thereof.
Figure 3:
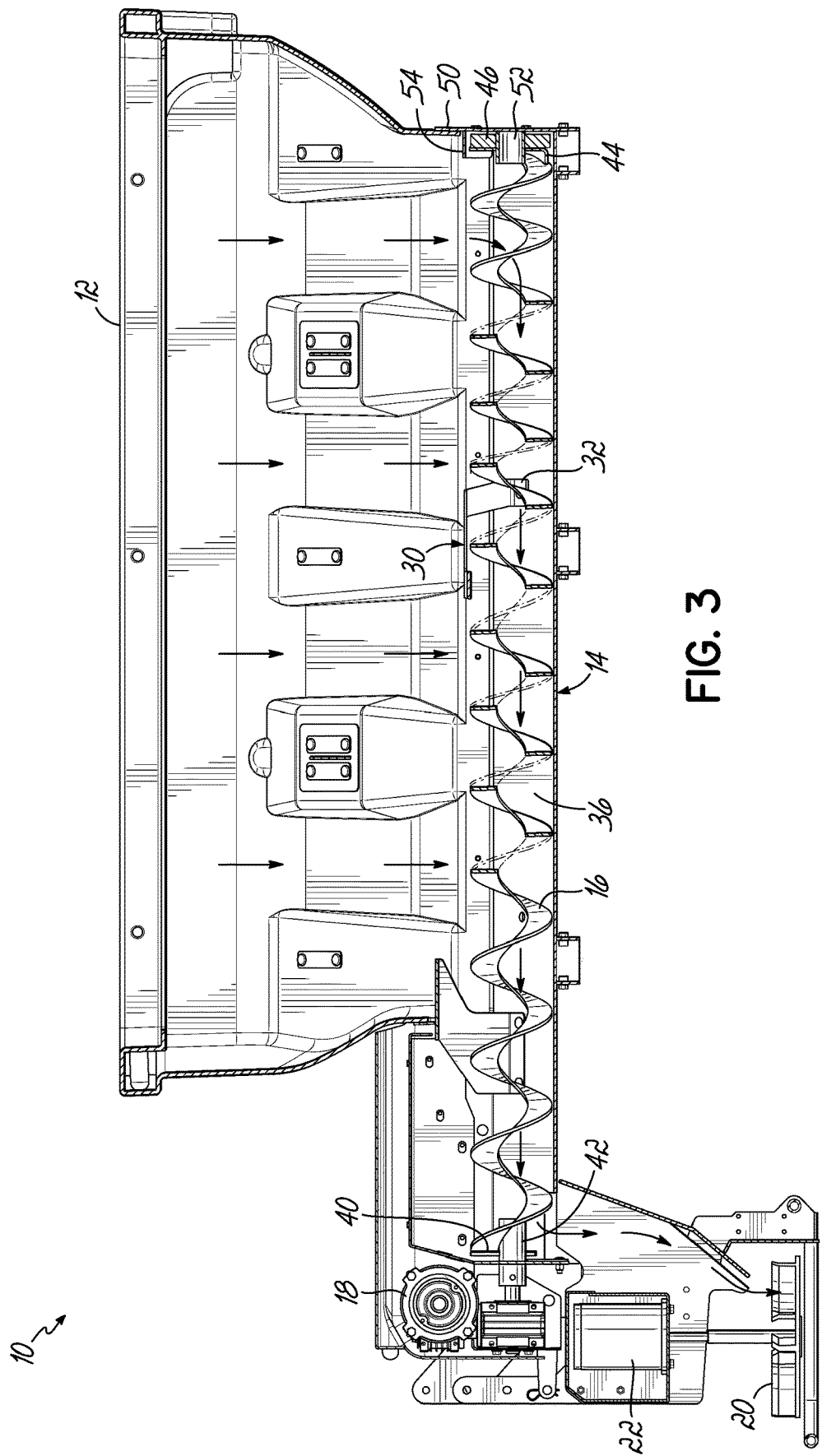
FIG. 3 is a right side cross-sectional view thereof.
Figure 3A:
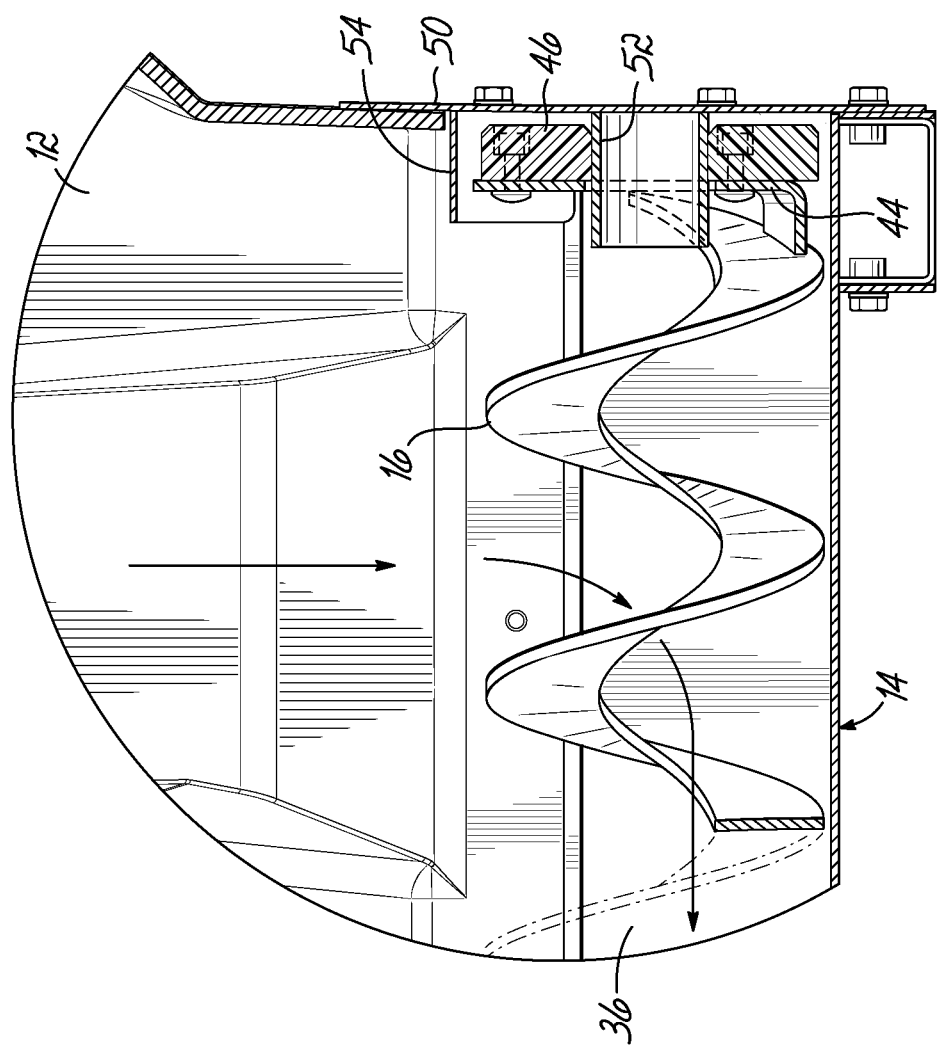
FIG. 3A is an enlarged view of the front end of the auger thereof.

Referring first to FIGS. 1-3, there is illustrated a spreader 10 according to the principles of the present invention. The spreader 10 includes a hopper 12 for containing sand, salt or other granular material to be spread upon snow or ice on paved surfaces. The spreader 10 is of the type that is mounted or installed in or on a bed of a truck. The hopper 12 has a generally U-shaped, V-shaped, or truncated V-shaped trough 14, a shaftless auger 16 positioned in the trough 14, an auger motor and gearbox 18 for driving the auger 16, a spinner 20 positioned at one end of the auger 16 for slinging the granular material upon the snow or ice, and a spinner motor 22 for driving the spinner 20.

Referring to FIGS. 1-5 and 7, the spreader 10 includes one or more keepers or retainers 30 supported by the hopper 12. The keeper or retainer 30 can be a strip or strap that has opposite ends 32, 34 secured to opposite sides 36, 38 of the trough 14. The strap extends over the auger 16 and is in close enough proximity to the auger 16 to function as a keeper or retainer to retain the auger 16 in place during operation, thereby reducing flexure of the auger 16 and resulting loss of efficiency of material transport by the auger 16 during operation of the spreader 10. The keeper 30 is a relatively narrow and relatively thin strip or strap, and, as best seen in FIGS. 2 and 4A, forms an angle of about 90 degrees with an edge of the flighting of the auger 16 directly below the strap 30. The strap is preferably about two inches wide and about 0.135 inches thick and is fabricated of stainless steel. Other dimensions and materials could of course be used. The keepers 30 contain the auger 16 with a nominal clearance. The angled shape of the keepers 30 stays in contact with the auger 16 throughout rotation of the auger 16. The minimal profile of the keepers 30 limits obstruction of the granular material.

Referring to FIGS. 3, 3A, and 5-8, the rear end of the auger 16 includes a disk 40 secured thereto as by welding that is rotatably secured to the drive shaft 42 of the auger motor 18. The front end of the auger 16 likewise includes a disk 44 secured thereto as by welding that has a bushing 46 secured thereto as by bolting. The bushing 46 is fabricated of a lubricious material, for example polymer, for example UHMW.

The spreader 10 further includes a bushing plate 50 secured to a front end of the hopper 12. The bushing plate 50 includes an approximately two inch diameter tube or spindle 52 that rotatably supports the bushing 46. The bushing plate 50 forms the front face of the trough 14 and is bolted thereto. With this construction there are no holes or paths for the granular material to escape and thus no potential for leakage. Bolting the bushing plate 50 to the trough 14 provides ease of serviceability, allowing the auger 16 to be removed from the front of the hopper 10. The bushing plate 50 can further include a shield 54 positioned above the spindle or tube 52 to deflect the granular material off of the bushing 46. The bushing plate 50, spindle 52, and shield 54 are preferably fabricated of stainless steel. The plate 50 and shield 54 can be about 0.06 inches thick and the tube can be about 0.12 inches thick. The plate 50 and spindle 52 function as both a radial bearing and a thrust bearing for the auger 16.

Figure 4:
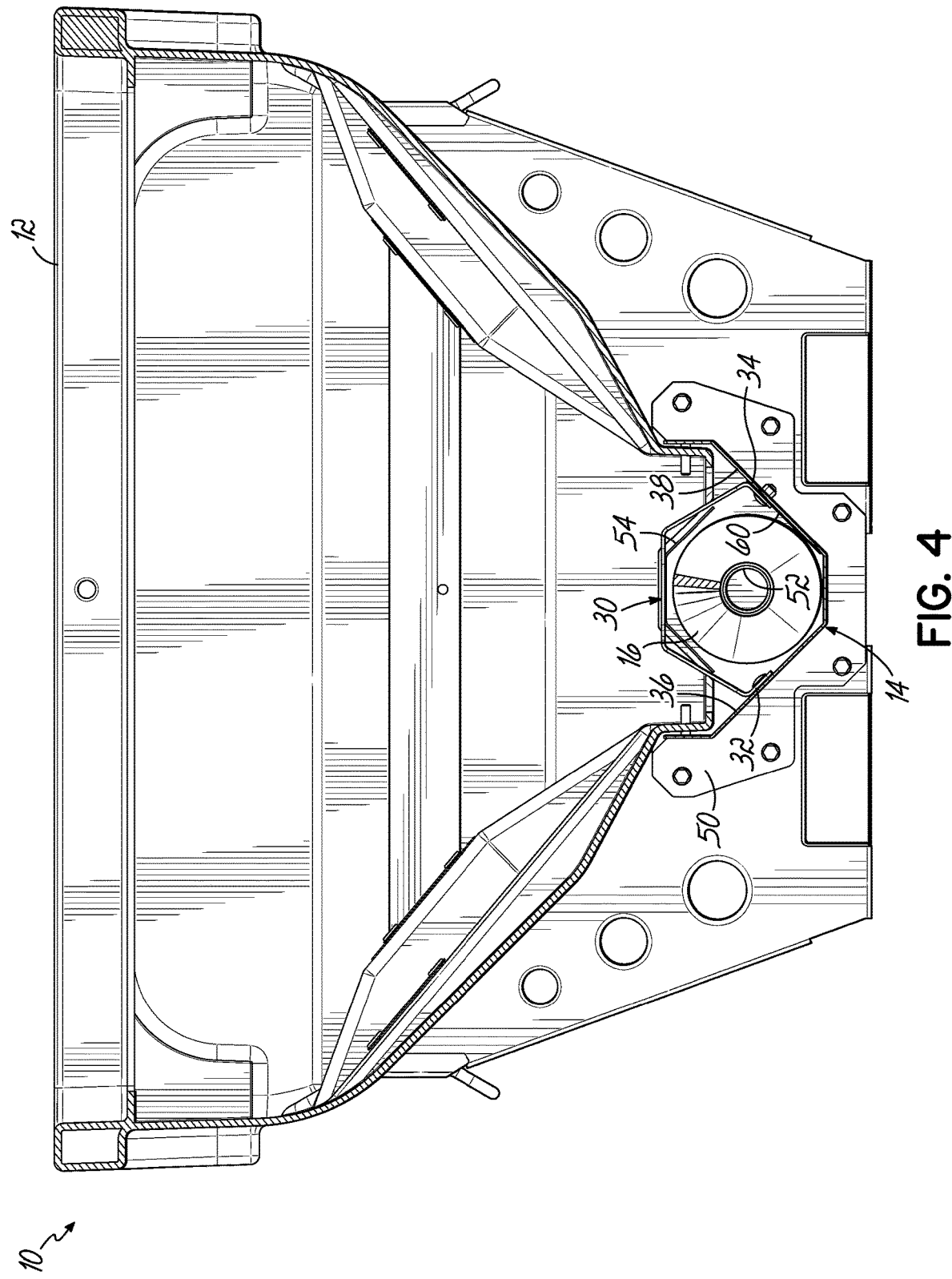
FIG. 4 is a cross-sectional view taken along line 4-4 in FIG. 2.
Figure 4A:
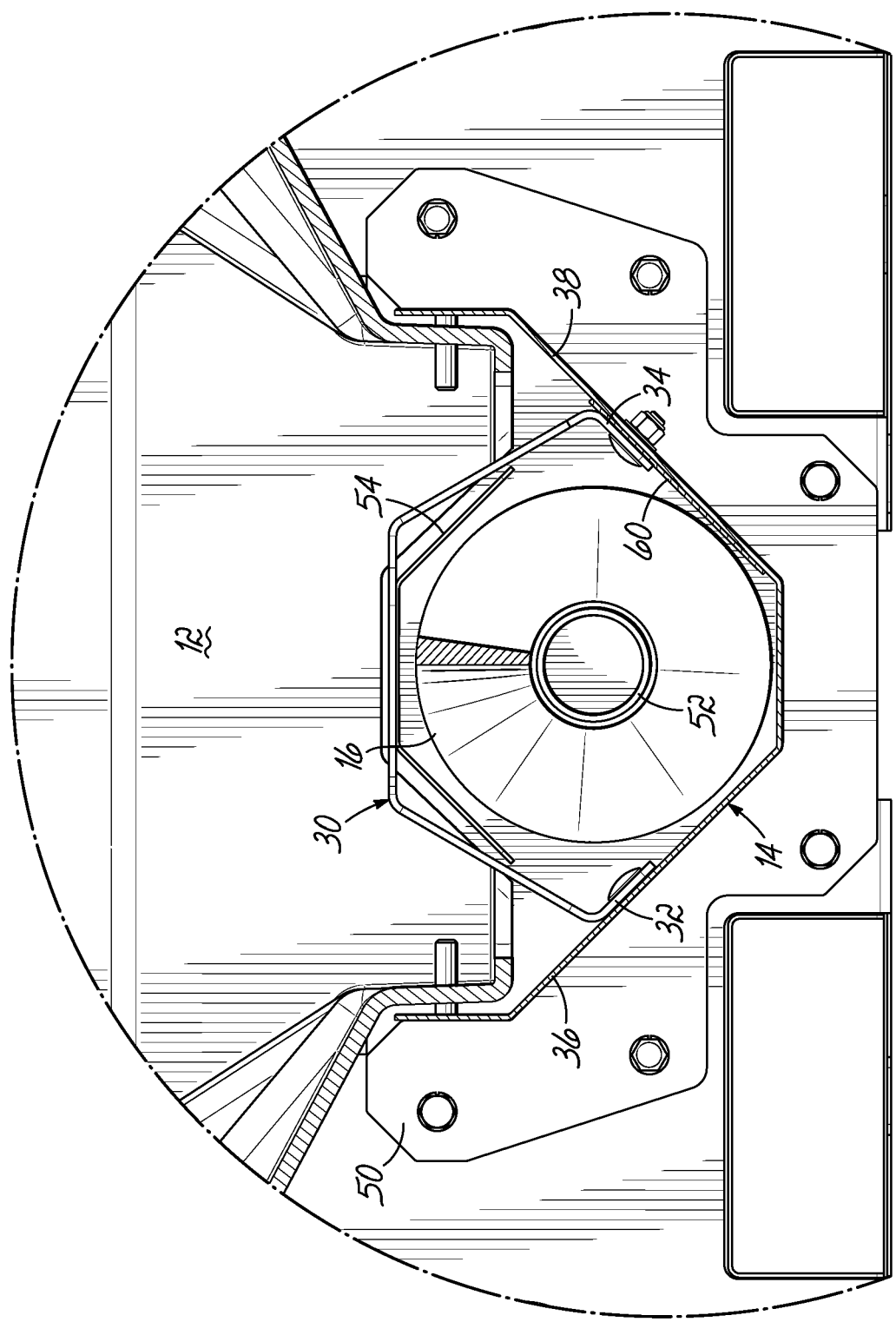
FIG. 4A is an enlarged view of the lower portion of FIG. 4.
Figure 5:
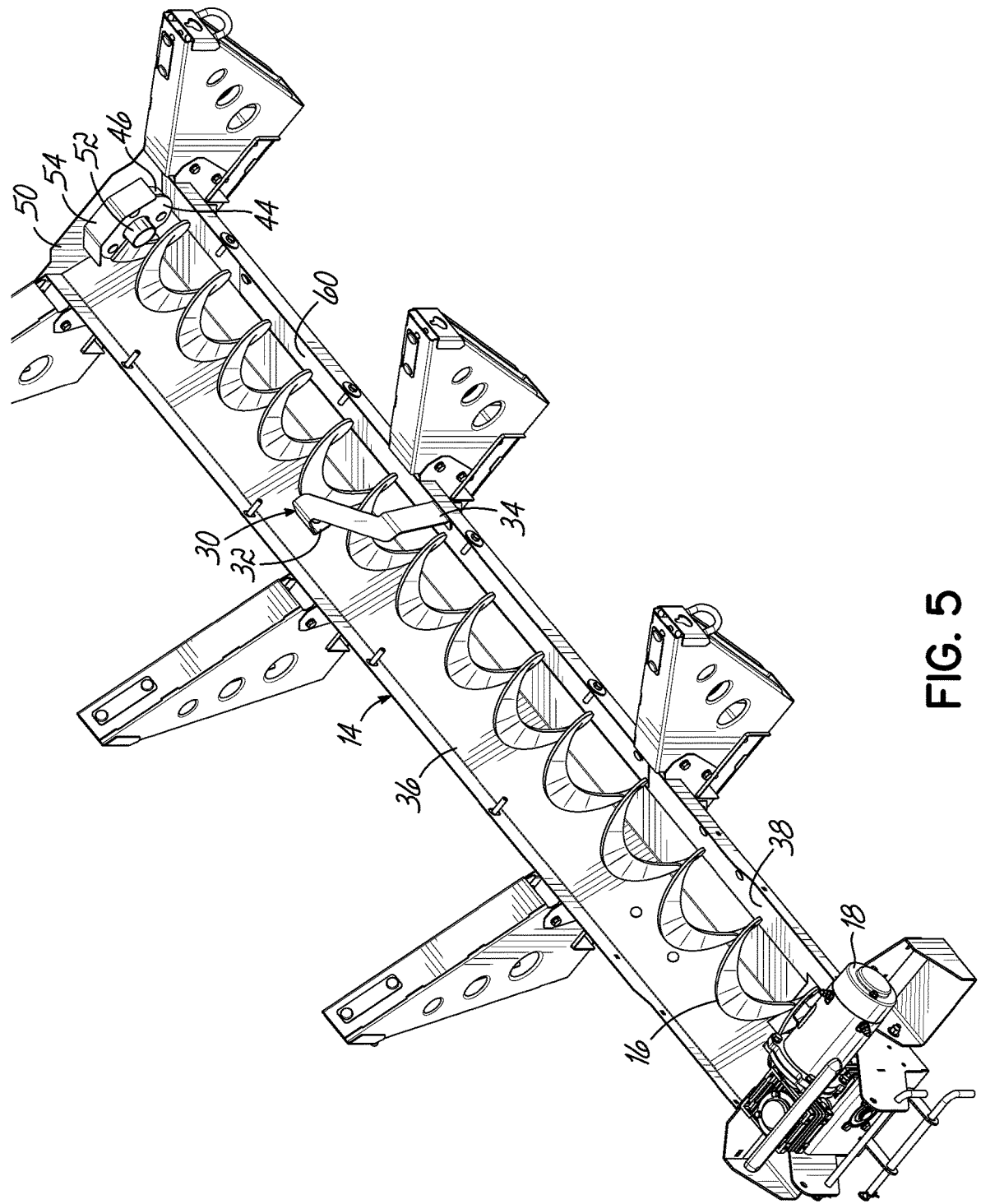
FIG. 5 is a top, rear, right side perspective of the auger and trough thereof.
Figure 6:
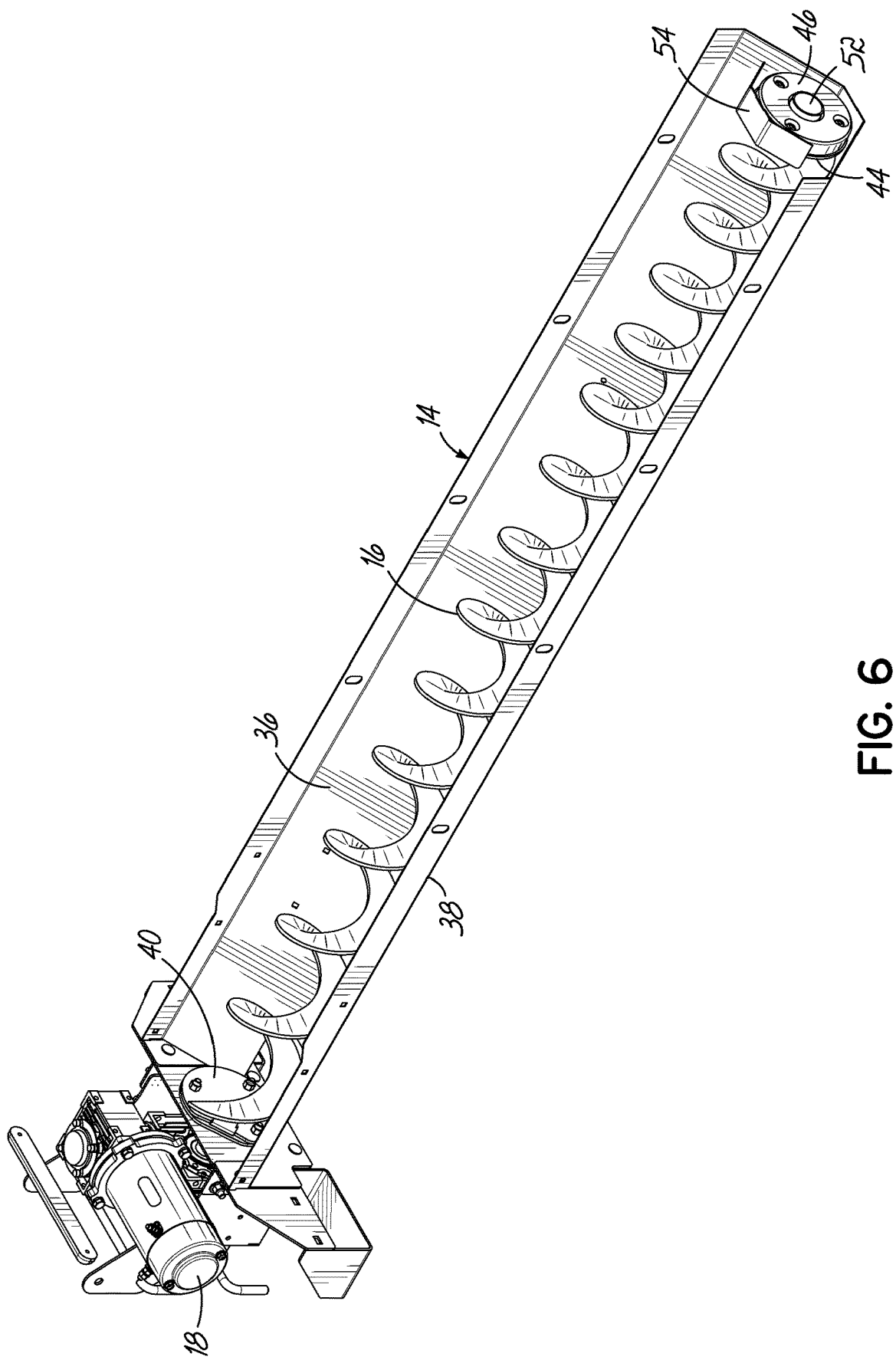
FIG. 6 is a top, front, right side perspective of the auger and trough thereof.
Figure 7:
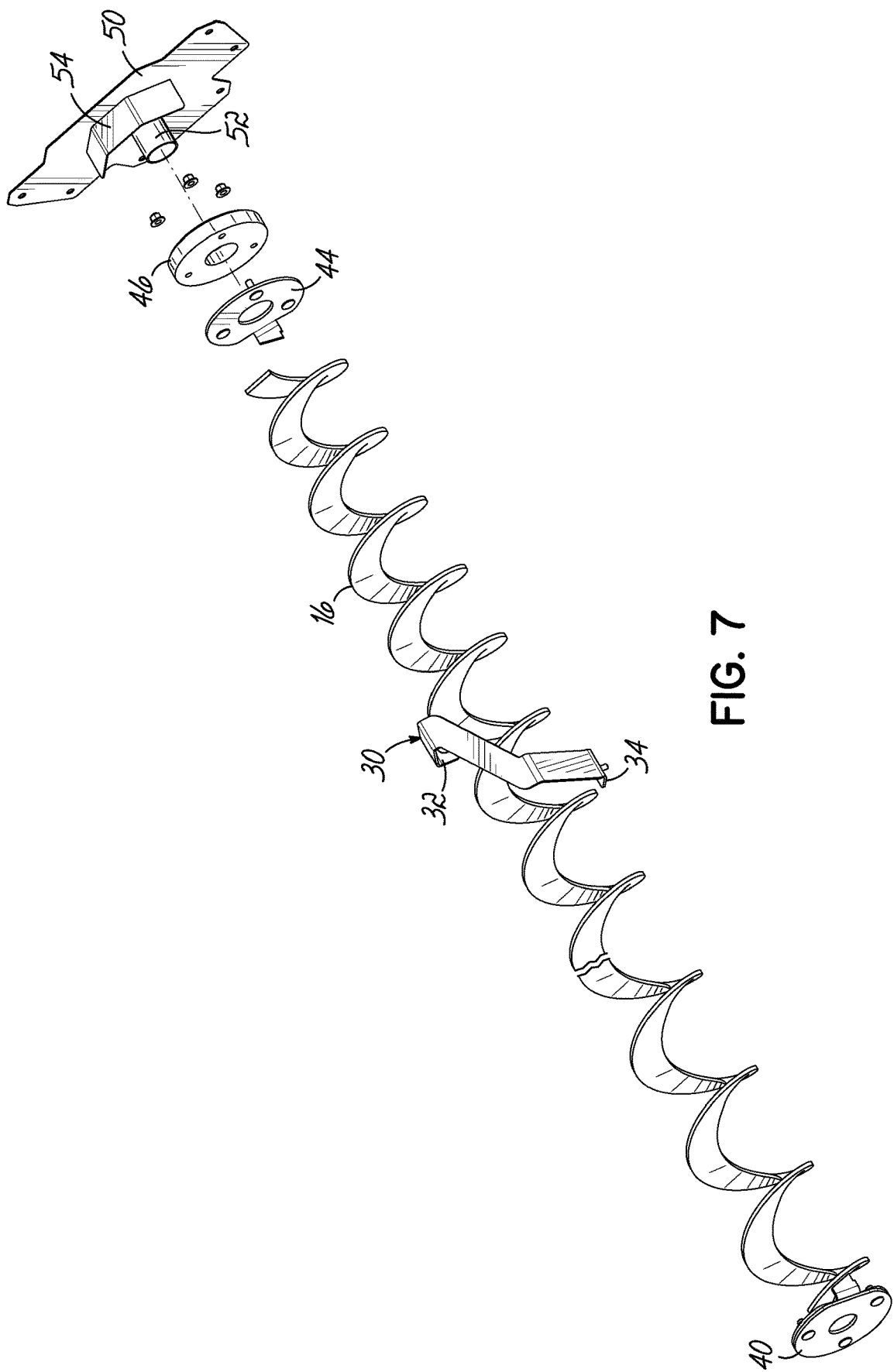
FIG. 7 is a top, rear, right side exploded perspective view of the auger thereof.
Figure 8:
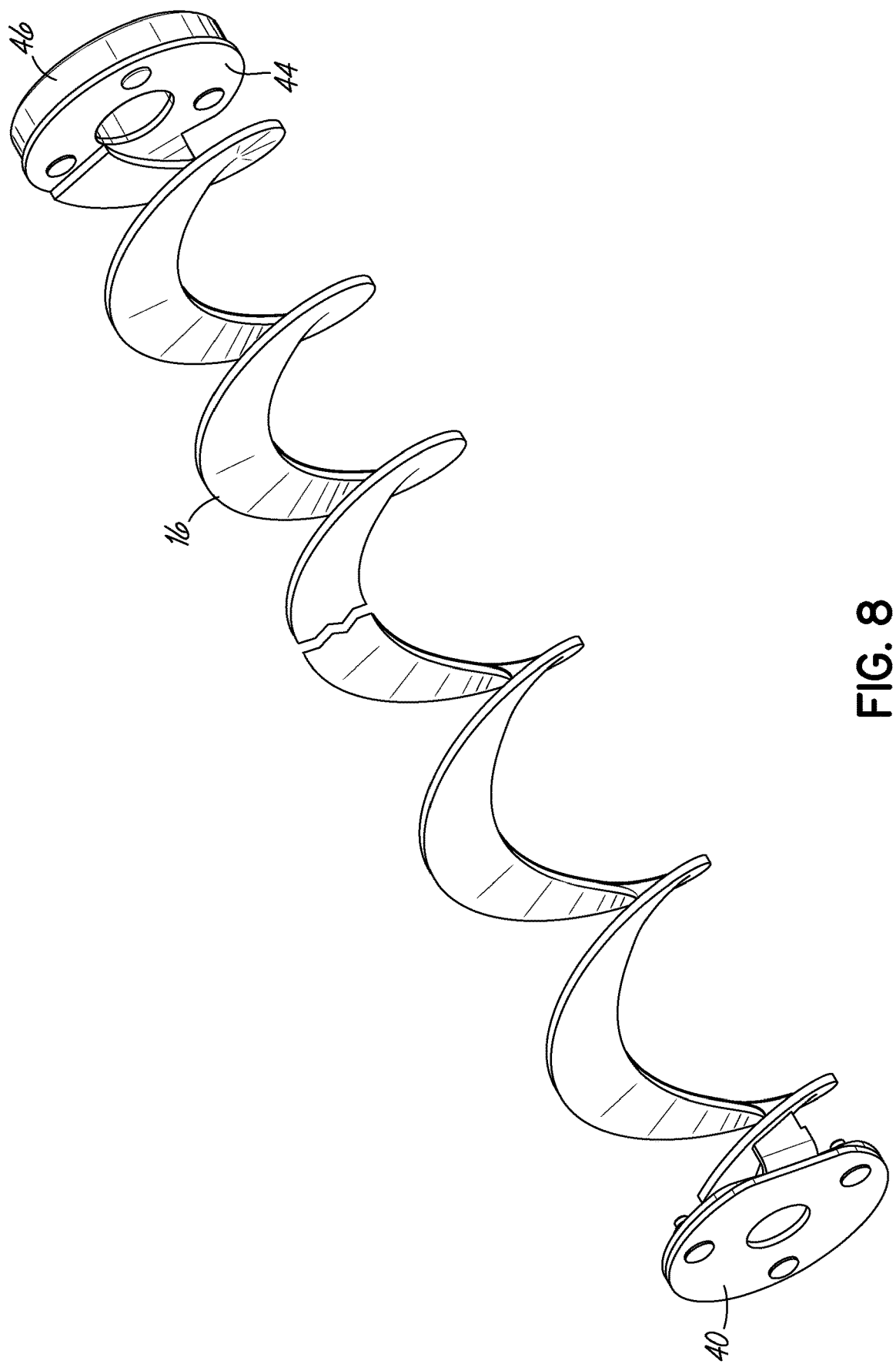
FIG. 8 is a view similar to FIG. 7 but with the central portion of the auger broken away and enlarged for clarity.

Referring to FIGS. 2, 4, and 4A, the spreader 10 can further include a replaceable wear plate 60 secured to a surface of one side 38 of the trough 14. The auger 16 naturally pulls or flexes to one side as it conveys material. The wear plate 60 thus need only be located on that one side of the trough 14 to protect the trough 14 from damage during operation. The wear plate 60 can be fabricated of 16 gauge stainless steel, can be about 0.06 inches thick, and can be bolted to the surface of the side 38 of the trough 14. It is thus easily replaceable as it wears.

Figure 9:
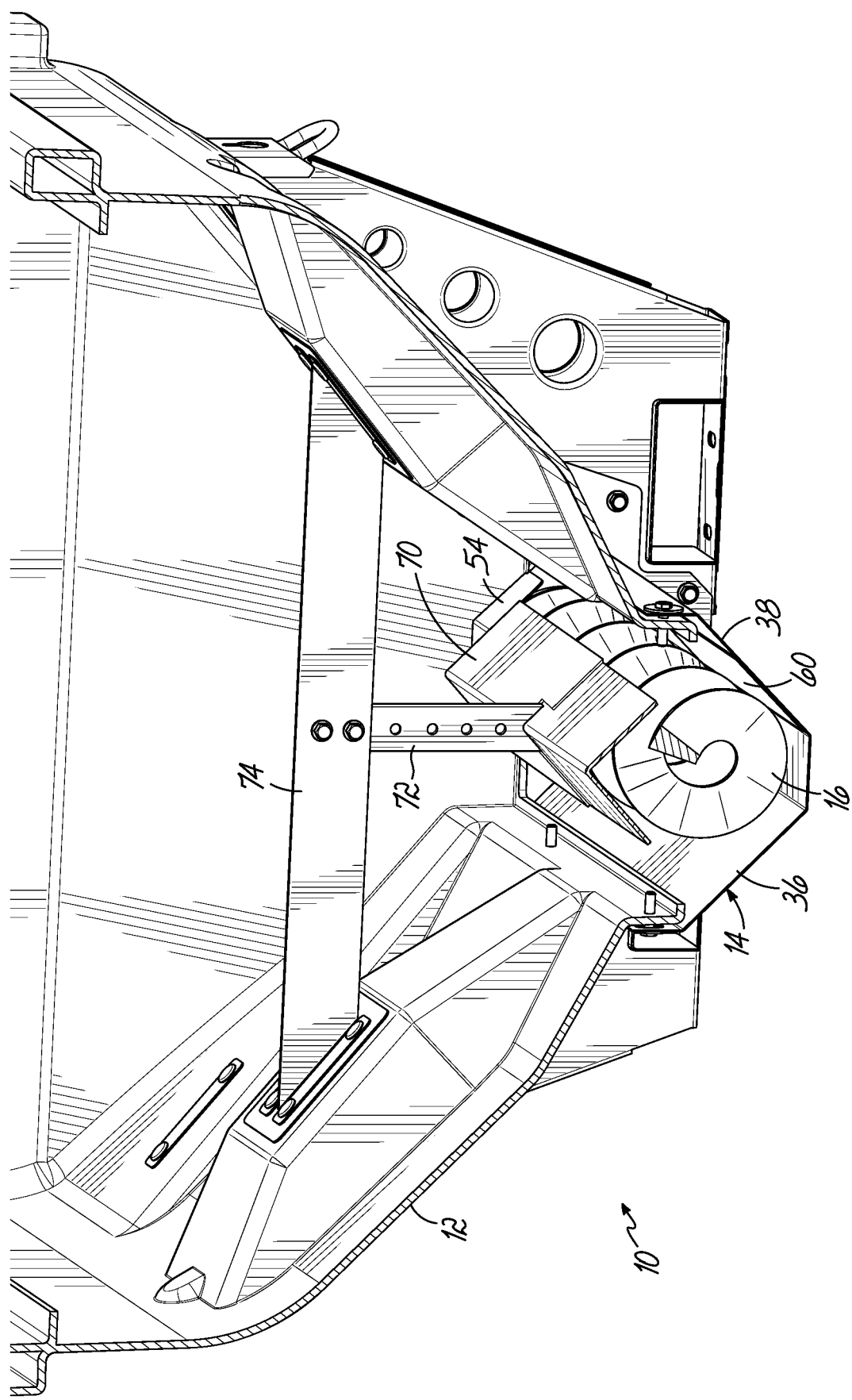
FIG. 9 is top, front, right side cross-sectional perspective view of the auger and an alternative embodiment of the keeper.

Referring now to FIG. 9, an alternative embodiment of keeper is illustrated. In this embodiment the keeper takes the form of an inverted V-shaped structure 70 positioned above the auger 16, supported by the hopper 12, and in close enough proximity to the auger 16 to function as a keeper or retainer. The structure 70 is suspended from a vertical support 72 which is connected to a transverse support 74 which itself is secured to opposite sides of the hopper 12. The inverted V-shaped structure 70 functions in much the same way as the straps 30, retaining the auger 16 in place during operation and thereby reducing flexure of the auger 16 and resulting loss of efficiency of material transport by the auger 16 during operation of the spreader 10. In addition, the inverted V-shaped structure 70 functions as a flow facilitator to facilitate flow of material to the auger 16 in much the same way as the flow facilitator described in the assignee's U.S. Pat. No. 6,953,163, which is hereby incorporated by reference as if fully set forth in its entirety.

The various embodiments of the invention shown and described are merely for illustrative purposes only, as the drawings and the description are not intended to restrict or limit in any way the scope of the claims. Those skilled in the art will appreciate various changes, modifications, and improvements which can be made to the invention without departing from the spirit or scope thereof. The invention in its broader aspects is therefore not limited to the specific details and representative apparatus and methods shown and described. Departures may therefore be made from such details without departing from the spirit or scope of the general inventive concept. The invention resides in each individual feature described herein, alone, and in all combinations of any and all of those features. Accordingly, the scope of the invention shall be limited only by the following claims and their equivalents.

What is claimed is:

1. A spreader comprising:
   a hopper for containing sand, salt or other granular material to be spread upon snow or ice on paved surfaces, said hopper being adapted to be installed in or on a bed of a truck, said hopper having a trough,
   an auger positioned in said trough,
   an auger motor for driving said auger,
   a spinner positioned at one end of said auger for slinging the granular material upon the snow or ice,
   a spinner motor for driving said spinner,
   a bushing secured to the other end of said auger, said bushing fabricated of a lubricious material, and
   a bushing plate secured to said hopper, said bushing plate including a spindle that supports said bushing, wherein said bushing plate further includes a shield positioned above said spindle to deflect the granular material off of said bushing, said shield including a top wall between two downwardly angled lateral side walls extending along a trough wall.

2. The spreader of claim 1 wherein said bushing is fabricated of polymer.

3. The spreader of claim 2 wherein said polymer is UHMW.

4. The spreader of claim 1 wherein said bushing is bolted to the other end of said auger.

5. The spreader of claim 1 further including a replaceable wear plate secured to a surface of one side of said trough to prevent damage to said one side of said trough during operation.

6. The spreader of claim 5 wherein said wear plate is fabricated of stainless steel and is about 0.06 inches thick.

7. The spreader of claim 5 wherein said wear plate is bolted to said surface of said one side of said trough.

8. A spreader comprising:
   a hopper for containing sand, salt or other granular material to be spread upon snow or ice on paved surfaces, said hopper being adapted to be installed in or on a bed of a truck, said hopper having a trough, said trough having a pair of lateral side walls,
   an auger positioned in said trough,
   an auger motor for driving said auger,
   a spinner positioned at one end of said auger for slinging the granular material upon the snow or ice,
   a spinner motor for driving said spinner, and
   a replaceable wear plate overlying and secured to only one of said pair of trough lateral side walls to prevent damage to said only one trough lateral side wall during operation, said only one trough lateral side wall being the side wall toward which said auger naturally pulls or flexes as it conveys material.

9. The spreader of claim 8 wherein said wear plate is fabricated of stainless steel and is about 0.06 inches thick.

10. The spreader of claim 9 wherein said wear plate is bolted to said surface of said one side of said trough.

* * * * *